: 2,913,658
Patented Nov. 17, 1959

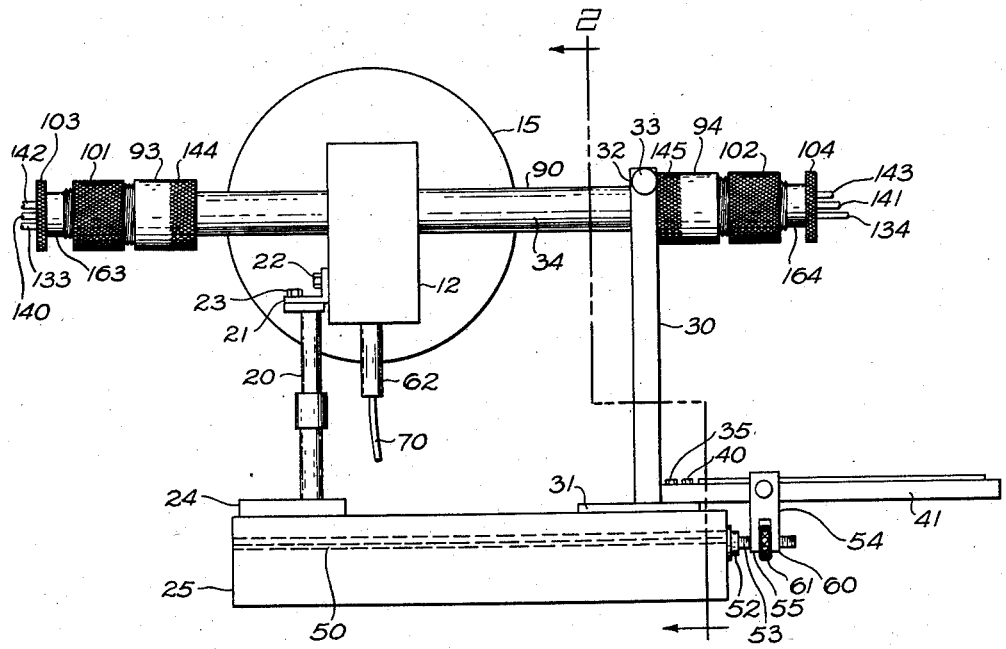

United States Patent Office

2,913,658
MEASUREMENT OF PHYSICAL CONDITIONS OF POROUS MATERIAL

Nathan Theodore Burdine, Dallas, Tex., assignor, by mesne assignments, to Socony Mobil Oil Company, Inc., a corporation of New York Application March 29, 1954, Serial No. 419,456

3 Claims. (Cl. 324—.5)

This invention relates to the measurement of physical conditions of porous material.

For various reasons, it is desirable or necessary to measure physical conditions of porous material. Such physical conditions include, for example, the fluid saturation of the porous material. Thus, in the solution of many problems relating to the performance of a subterranean oil reservoir, it is necessary or desirable to measure fluid saturation of a core sample taken from the reservoir. By saturation is meant the percentage of the pore volume of the core sample filled with each of the fluid phases contained within the sample. This measurement is required, among other reasons, for determination of the relative permeability of the core sample, i.e., the ratio of the permeability to a given fluid in the presence of another fluid or fluids and the permeability to the given fluid in the absence of any other fluid. However, a problem arises in the measurement of fluid saturation of the core sample to each of the fluid phases. The problem owes its origin primarily to the necessity for making the measurement without interference with the determination of the permeability of the core sample. In the measurement of other physical conditions of porous material, there exists a similar problem of avoiding interference with another measurement.

It is an object of this invention to measure a physical condition of a porous material. It is another object of this invention to measure a physical condition of a core sample. It is another object of this invention to measure the fluid saturation of a porous material. It is another object of this invention to measure the fluid saturation of a core sample. It is another object of this invention to measure the saturation of a porous material to one fluid phase in the presence of another fluid pase. It is another object of this invention to measure fluid saturation of a core sample during measurement of relative permeability. Further objects of the invention will become apparent from the following detailed description.

Figure 1 is a side view of one form of apparatus for measuring a physical condition of a porous material in accordance with the invention.

Figure 2 is a view taken along the line 2—2 of Figure 1.

Figure 3 is a view of a scale for indicating the location of the sample of porous material.

Figure 4:
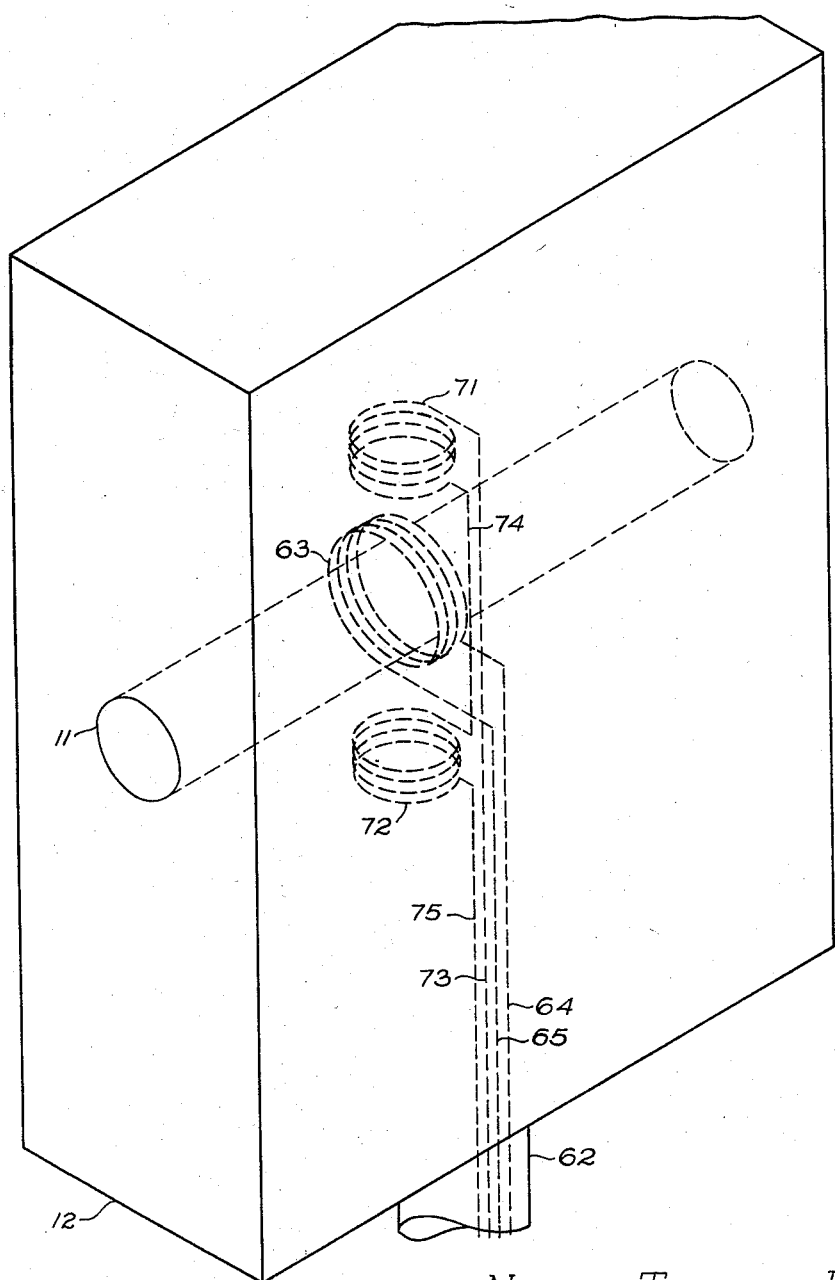
Figure 4 is an isometric view of the detecting head of the apparatus.

In accordance with the invention, a sample of porous material containing a quantity of fluid is subjected simultaneously to the action of a constant magnetic field and a pulsating magnetic field, the direction of each field being substantially perpendicular to the other, and the intensity of the magnetic field induced by precession of the atomic nuclei of the fluid within the sample of porous material under the influence of the constant and pulsating magnetic fields is measured and compared with the intensity of the magnetic field obtained with the sample containing a different quantity of the same fluid.

The invention is based upon the postulate that nuclei of atoms of various eleemnts tend to precess when subjected to the action of a constant magnetic field and in the absence of damping forces would precess at a characteristic frequency termed the Larmor frequency. Where a pulsating magnetic field is imposed upon the nuclei in a direction perpendicular to the constant magnetic field and the frequency of the pulsating magnetic field is in resonance with the Lamor frequency, the damping forces will be overcome and the nuclei will precess. As a result of the precession, another pulsating magnetic field is induced. Mathematically expressed, the frequency of the pulsating magnetic field required to obtain precession of the atoms is as follows:

$$f = \frac{\gamma H}{2\pi}$$

where $f$ is the frequency of the pulsating magnetic field in megacycles, $\gamma$ is the gyromagnetic ratio of the atoms, and $H$ is the intensity in gauss of the constant magnetic field.

In the practice of the invention, the sample of porous material containing the fluid is positioned within the constant magnetic field. The pulsating magnetic field whose direction is perpendicular to that of the constant magnetic field is imposed upon the core sample. The intensity of the constant magnetic field and the frequency of the pulsating magnetic field are selected to obtain precession of the nuclei of these atoms, the selection being made in accordance with the above expression taking into consideration the gyromagnetic ratio of the atoms of the fluid. The magnetic field induced by the precession is detected employing a coil, and the intensity of this induced magnetic field is measured. The quantity of fluid in the sample of porous material is changed and the intensity of this magnetic field induced by the precession is measured. By comparing the intensity of these induced magnetic fields, information as to physical conditions of the sample of porous material is obtained.

The invention will now be more particularly described in connection with the measurement of fluid saturation of porous material. In the measurement of the fluid saturation of a core sample, or another sample of porous material, in accordance with the invention, the intensity of the induced magnetic field with the unknown quantity of fluid in the core sample is measured. The intensity of this induced field is a measure of the number of atoms of the fluid contained in the core sample within the common zones of influence of the constant magnetic field, the pulsating magnetic field, and the detecting coil. The intensity of the induced magnetic field is also measured with the core sample completely saturated with the same fluid. The ratio of the induced fields obtained with the sample containing the unknown quantity of fluid and with the sample completely saturated with the same fluid is proportional to the ratio of the unknown quantity of the fluid to the quantity of the fluid at saturation. By measuring the absolute quantity of the fluid in the core sample at saturation by other means, the absolute value of the unknown quantity of fluid can be determined if desired.

Measurements of the saturation of a porous material are most commonly made with respect to one or more of three fluid phases, namely, air, oil, and water. The elements in quantity in air, oil, and water are oxygen, nitrogen, carbon, and hydrogen. Of these elements, hydrogen will precess to produce a detectable magnetic field. Nitrogen will also precess but the quantity of atomic nuclei of nitrogen in air, air being a gas, is so small per unit volume that the magnetic field induced will be for practical purposes undetectable. The other elements will not precess. Thus, the fluid saturation of a porous material to water or to oil, both of which contain hydrogen, can be determined in the presence of air or other hydrogen-free gas. Deuterium, or heavy hydrogen, will also precess to produce a detectable magnetic field and its gyromagnetic ratio differs from that of hydrogen. Thus, deuterium can be detected in the presence of hydrogen. In accordance with a feature of the invention, in the study of fluid flow or static properties of a porous material where the extent of fluid saturation of the porous material to an air or other gas phase which does not contain hydrogen, an oil phase, or a water phase is to be determined in the presence of two or more of the other phases, deuterium oxide, or heavy water, may be employed in place of water. By this procedure, the extent of saturation of each of the phases can be determined, the saturation of the air phase being taken by difference.

Referring now to the drawings, a sample of porous material 10 containing a fluid phase is positioned within sample chamber 11 in probe 12. The probe 12 is mounted within air space 13 between electromagnets 14 and 15. The probe 12 is mounted upon arm 20 by means of bracket 21. Bolts 22 serves to fasten the bracket to the probe and bolt 23 serves to fasten the bracket to the arm. The arm 20 is mounted upon plate 24 and the plate rests upon base 25.

Arm 30 is mounted upon plate 31 and the plate 31 rests upon the base 25. The arm 30 at its top portion forms collar grip 32 and the collar grip is provided with tightening screw 33. Sample tube 34 passes through the collar grip. Fixedly mounted upon plate 31 by means of bolts 35 and 40 is horizontal arm 41 inscribed with meter scale 42. Cooperating with scale 42 is vernier scale 43 inscribed upon arm 44 fixedly mounted upon base 25 by means of bolt 45.

The base 25 is provided with longitudinally extending channel 50 shaped in the form of an inverted T. The plate 31 has tongue 51 integrally connected thereto and the tongue is shaped to fit snugly into channel 50 whereby movement of the plate 31 coincides with the direction of the channel. The plate 24 has a similar tongue (not shown) integrally connected thereto and shaped to fit snugly into chamber 50 whereby any movement of the plate 24 also coincides with the direction of the channel. Connected to the base 25 by means of collar 52 and extending horizontally and longitudinally is threaded rod 53. Brace 54 is fixedly attached to arm 41 and is provided with fingers 55 and 60. The rod 53 passes through ports (not shown) in each of the fingers and threaded knurled ring 61 on the rod 53 is positioned between the fingers. By movement of the ring 61, the plate 31 may be moved along the longitudinal axis of the base 25 and thus the sample tube 34 may be moved to various positions within the sample chamber 11 in probe 12.

The probe 12 is constructed of non-magnetic material. The material may be a plastic which does not contain atomic nuclei which will precess under the field conditions employed but is preferably a metal such as aluminum. The probe is provided with a handle 62 and the sample chamber extends throughout the entire width of the otherwise substantially solid block of material. Coil 63 is provided within the probe 12 and this coil is wound such that it is longitudinally coaxial with the sample chamber 11. Conductors 64 and 65 lead to the coil 63 and pass through the handle 62 through cable 70. Coils 71 and 72 are also provided within the probe 12 and these coils are wound such that they are longitudinally coaxial with each other. The longitudinal axes of the coils 71 and 72 are substantially orthogonal to the longitudinal axis of the sample chamber 11 and also intersect the transverse axis of the coil 63. Means (not shown) are provided within the probe to vary the orientation of the coils 71 and 72 with respect to the longitudinal axis of the sample chamber and thus with respect to the magnetic field produced by the electromagnets 14 and 15 in order to compensate for errors in construction of the coils producing field components interfering with the magnetic field induced by precession of the nuclei. Coils 71 and 72 are connected in series, conductor 73 being connected to coil 71, conductor 74 being connected between the two coils, and conductor 75 being connected to the coil 72. The conductors 73 and 75 also lead through the handle 62 through cable 70. Where the probe 12 is constructed of an electrically conducting material, suitable insulation is provided for the coils and the conductors.

Figure 5:
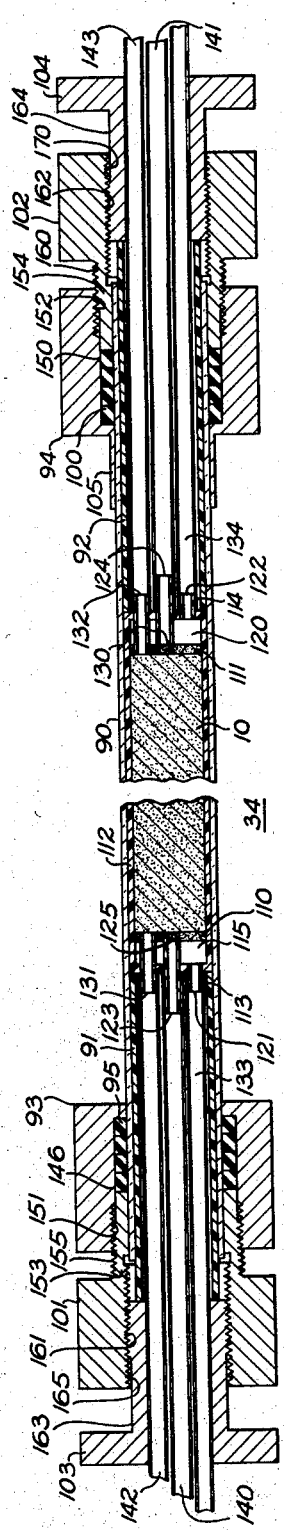
Figure 5 is a detailed sectional view of the sample tube of the apparatus.

Referring to Figure 5, the sample 10 of porous material is contained within sample tube 34. The sample tube 34 comprises generally cylindrical tube 90 which has a diameter such that it will fit within the sample chamber 11 in probe 12, a pair of cylindrical spacer tubes 91 and 92, clamping collars 93 and 94, gasket assemblies 95 and 100, sealing collars 101 and 102, and spacing collars 103 and 104. Clamping collar 94 is provided with neck 105 and the neck fits within collar grip 32 on arm 30.

Where the sample 10 of porous material is a core sample and measurement of fluid saturation is to be made during measurement of relative permeability employing at least two fluid phases in the core sample, membranes 110 and 111 are positioned at each end of the sample, each of the membranes having a plane surface tightly contacting a plane surface of the sample. The membranes 110 and 111 are constructed of non-magnetic, porous material, such as unglazed porcelain, fire clay, ultra-fine fritted glass, pumice stone, and the like, which when saturated with a first fluid presents a minimum displacement pressure to the flow of another fluid immiscible with the first. These membranes are well known in the art and are commonly termed semi-permeable membranes. The sample and the membranes are enclosed within tube 112 such that flow of fluid between the tube and the sample and membranes is prevented. The tube 112, as well as the tube 90, is constructed of a plastic or other type of non-magnetic material which does not contain atomic nuclei which will precess under the field conditions imposed. The tube 112 is also provided at each of its ends with closures 113 and 114, respectively, the closures being shaped to form chambers 115 and 120, respectively. The closures may be formed of the same material as the tube 112 or may be formed of different material. If formed of different material, the material should be one that is non-magnetic and does not contain atomic nuclei which will precess under the field conditions employed if the closures come within the conmmon zones of influence of the constant magnetic field, the pulsating magnetic field, and the detecting coil while measurement of saturation is being made. Tubes 121 and 122 lead through the closures 113 and 114 to chambers 115 and 120, respectively. Tubes 123 and 124 lead through the closures 113 and 114 and pass through the membranes 110 and 111, respectively. The tubes 123 and 124 are each closed with plugs 125 and 130, respectively, formed of the same material as the membranes 110 and 111. Tubes 131 and 132 pass through the closures 113 and 114 and the membranes 110 and 111, respectively, to contact the sample 10. The tubes 121, 122, 123, 124, 131, and 132 may be formed of the same material as the closures 113 and 114, or may be formed of a different material. If formed of a different material, however, the material should be one that is non-magnetic and does not contain atomic nuclei which will precess under the field conditions employed if the tubes come within the common zones of influence of the constant magnetic field, the pulsating magnetic field, and the detecting coil while measurement of saturation is being made. These tubes must be sealed to the closures or otherwise provided with a fluid tight joint to prevent leakage of fluid from the chambers 115 and 120 between the closures and the tubes. Tubes 121, 122, 123, 124, 131, and 132 are connected to fluid conducting lines 133, 134, 140, 141, 142, and 143, respectively.

The clamping collars 93 and 94 are provided with knurled areas 144 and 145, gasket chambers 146 and 150, and internal threads 151 and 152, respectively. Gasket assemblies 95 and 100 fit into the gasket chambers 145 and 150, respectively, and each of the gasket assemblies comprises a plurality of ring gaskets constructed of rubber or other suitable material, four gaskets being shown in each chamber. The sealing collars 101 and 102, knurled on their outer surfaces, are provided with necks 153 and 154, respectively, and the necks are provided with external threads 155 and 160, respectively, which cooperate with threads 151 and 152, respectively. The sealing collars are also provided with internal threads 161 and 162, respectively. Spacing collars 103 and 104, knurled on their outer surfaces, are provided with necks 163 and 164, respectively, and the necks are provided with threads 165 and 170, respectively, which cooperate with threads 161 and 162, respectively.

In measurement of fluid saturation, the sample is positioned within the sample chamber in the probe 12 so as to intercept the longitudinal axes of the coils 71 and 72. The electromagnets 14 and 15 are energized to provide the constant magnetic field, and alternating current is passed between the conductors 73 and 75 to coils 71 and 72 to provide the pulsating magnetic field. The pulsating magnetic field will have a frequency equal to the frequency of the alternating current passed between the conductors 73 and 75 and the frequency of the alternating electric current employed will have the value of $f$ in the expression given hereinabove. In selecting the value of $f$, the value of $\gamma$, the gyromagnetic ratio of the atoms, will be the value for hydrogen or other atoms characteristic of the fluid whose saturation in the porous material is to be determined. For hydrogen this value will be $2.71 \times 10^4$ c.g.s. For deuterium this value will be $4.15 \times 10^3$ c.g.s. Values for the gyromagnetic ratio of atoms of other elements may be readily found by reference to standard physical tables.

The constant magnetic field must be uniform at least through the portion of the air space 13 occupied by the portion of the sample within the zone of influence of the coil 63. The intensity of the constant magnetic field to be employed will be dependent upon the resolution of measurement required and the resolution required will, in turn, be dependent upon the amount of fluid within the sample. A greater resolution is obtained with a field strength of higher intensity and greater resolution is required with smaller amounts of fluid in the sample. Satisfactory results have been obtained in many cases employing a field having an intensity between about 1,000 and 10,000 gauss. However, higher field strengths have also been employed.

It is usually desirable to employ a magnetic field having a minimum intensity consistent with satisfactory resolution of measurement. The minimum intensity satisfying this condition varies somewhat with the atom which is characteristic of the fluid whose saturation in the porous material is to be measured. Thus, under comparable conditions, the intensity of the constant magnetic field to be employed will be lower where hydrogen is the characteristic atom than where deuterium is the characteristic atom. For hydrogen, satisfactory results have been obtained where the stationary magnetic field had an intensity of about 1,500 gauss. For deuterium, satisfactory results have been obtained where the stationary magnetic field had an intensity of about 7,000 gauss. When employing stationary magnetic fields having these intensities, the pulsating field, and the alternating electric current supplied through the conductors 73 and 75, will have a frequency of about 6.5 megacycles where hydrogen is the atom characteristic of the fluid whose saturation in the core sample is to be measured and will have a frequency of about 4.6 megacycles where deuterium is the atom characteristic of the fluid whose saturation in the porous material is to be measured. The current supplied through the conductors 73 and 75 may be such that the pulsating magnetic field produced by the coils 71 and 72 has an intensity of 0.2 gauss where hydrogen is the atom characteristic of the fluid and 2.0 gauss where deuterium is the atom characteristic of the fluid.

The atoms having the gyromagnetic ratio $\gamma$ within the sample over that portion thereof between the coils 71 and 72 will precess under the influence of the stationary magnetic field having intensity H and the pulsating magnetic field having the frequency $f$. As a result of this precession, a pulsating magnetic field is induced which has a frequency equal to the frequency of the pulsating magnetic field produced by the coils 71 and 72, i.e., the Larmor frequency. This second pulsating magnetic field is detected by the coil 63 to produce an alternating current in the conductors 64 and 65 and this current is measured. The intensity, or voltage, of the alternating electrical current is, as stated hereinabove, proportional to the number of atoms of the element having the gyromagnetic ratio $\gamma$ in the portion of the sample of porous material within the common zones of influence of the constant magnetic field and the coils 63, 71, and 72. By changing the position of the sample of porous material within the sample chamber 11, another portion of the sample is placed within the field of influence of the coils 63, 71, and 72, and the intensity of the alternating current proportional to the number of atoms of the element having the gyromagnetic ratio $\gamma$ in this portion of the sample is similarly determined.

The same procedure is followed in determining the intensity of the induced magnetic field with the sample of porous material completely saturated with the fluid. Saturation of the sample may be effected by any procedure known to the art. Thereafter, the sample is placed in the sample chamber 11 and, under similar conditions of intensity of the stationary magnetic field and strength and frequency of the pulsating magnetic field, the intensity of the alternating current in the conductors 64 and 65 is measured.

In order to assist in locating the position of the sample of porous material when in the sample chamber 11 within the common zones of influence of the coils 63, 71, and 72, and to assist in returning the sample to the same position at a subsequent time, meter scale 42 is provided. With the sample of porous material within the sample tube 34 and the tube 34 positioned within the sample chamber 11 in the probe 12 and held tightly by the collar grip 32, plate 31 may be moved along the channel 50 by manipulation of ring 61. The probe remains stationary and the relative positions of the sample of porous material are indicated by the reading of the meter scale 42. By noting a position indicated by the meter scale 42, the sample of porous material may be subsequently returned to this same position, assuming that the position of the sample with respect to the sample tube, the position of the sample tube with respect to the arm 30, and the position of the probe 12 have not changed.

The invention is of particular utility in determining the extent of saturation of a core sample during measurement of relative permeability. For measurement of relative permeability, the core sample 10, as described above in connection with Figure 5 and with membranes 110 and 111 contacted therewith, is enclosed within the tube 112. The tube 112 is positioned within the sample chamber 11 in the probe 12. Either of the three tubes 133, 140 and 142 or 134, 141, and 143 are passed through spacer tubes 91 or 92, respectively. Assuming tubes 133, 140, and 142 have been passed through spacer tube 91, these tubes are connected to tubes 121, 122, and 123. The core sample is then inserted into tube 90. The core sample is moved to the opposite end of the tube from the end into which it was inserted and tubes 134, 141, and 143, having first been passed through spacer tube 92, are attached to tubes 124, 131, and 132, respectively. The spacer tube 92 is inserted into the tube 90 and the core sample is positioned in the neighborhood of the center of the tube 90. Each of clamping collars 93 and 94 with their respective gasket assemblies 145 and 150 are placed around tube 90. Sealing collars 101 and 102 are placed around the tube 90 and the necks 153 and 154, respectively, are screwed into the clamping collars 93 and 94, respectively. The sealing collars 101 and 102 are tightened to compress the gasket assemblies 145 and 150, respectively, against the tube 90 and thus prevent movement of the clamping collars 93 and 94 with respect to the tube. Spacing collars 103 and 104 are placed around the tube 90 and the necks are screwed into the sealing collars 101 and 102, respectively, to contact the ends of the spacing tubes 91 and 92 and thereby immobilize the core sample 10 in its position within the tube 90.

In measurement of relative permeability, in accordance with one method, the core sample, the semi-permeable membranes, and the plugs 125 and 130 are, prior to placing of the core sample in the tube 90, saturated with one fluid. This fluid is known as the wetting fluid. Thereafter, the wetting fluid and a fluid immiscible with the wetting fluid are passed through the core sample and the permeability of the sample to each of these fluid phases determined from the rate of flow and the pressure drop of each of the fluids.

The wetting fluid is passed through the core sample between tubes 133 and 134 and the rate of flow is measured. The pressure drop of this fluid passing through the core sample is also measured by means of gauges connected to tubes 140 and 141 and by provision of the plugs 125 and 130. The pressure differential measured will be that between the portion of the core sample just adjacent to each of the semi-permeable membranes. The non-wetting fluid is passed through the core sample through lines 142 and 143 and the rate of passage and the pressure drop of this fluid are measured. From the information obtained and the saturation of the sample to each of the fluids, the relative permeability of the wetting and non-wetting fluid is determined.

As a specific example of determination of relative permeability, the core sample, the semi-permeable membranes 110 and 111 and the plugs 125 and 130 are saturated with kerosene. At this point, the intensity of the alternating current in the conductors 64 and 65 is measured with the sample completely saturated with kerosene. Since kerosene contains hydrogen and air does not contain hydrogen, hydrogen is the atom characteristic of the fluid whose saturation in the core sample is to be measured. The constant magnetic field and the pulsating magnetic field are selected to have an intensity and frequency, respectively, to obtain precession of the hydrogen nuclei. After measurement of the intensity of the alternating current in the conductors 64 and 65, kerosene is passed through the core sample from tube 133 to tube 134 at a fixed rate and air is passed through the sample from tube 142 to tube 143 also at a fixed rate. The degree of saturation of the core sample with respect to kerosene is reduced by this procedure and when equilibrium conditions have been established, the pressure drops of both fluids over the core sample are measured, the flow rates remaining constant throughout the period of attainment of equilibrium. The intensity of the alternating current in the conductors 64 and 65 is also measured when equilibrium conditions have been established.

A similar procedure is employed where the fluids are air and water. Hydrogen will again be the characteristic atom. Where the fluids are water and oil, heavy water or deuterium oxide is employed instead of water, and the saturation to either the oil or heavy water is measured by determination of the intensity of the induced current in the conductors 64 and 65 by employing field conditions to obtain precession of either the hydrogen nuclei or the deuterium nuclei. Where three fluids, air, oil and water, are employed and the saturation of the sample to each of the fluids is to be measured, heavy water is again employed and the saturation to both the oil and the heavy water is measured, the saturation to the air being the difference between the pore volume of the sample and the sum of the saturations of the oil and the heavy water.

In view of the fact that the fluid saturation will not be uniform over the entire length of the core sample 10, it is desirable to measure the fluid saturation at various points along the length of the core sample. By operation of ring 61 the tube 90 may be moved relative to the probe 12 and thus various portions of the core sample may be positioned within the common zones of influence of the coils 63, 71, and 72. The alternating current in the conductors 64 and 65 for each position of the core sample as indicated by the meter scale 42 is measured. The same procedure is also followed with the core sample completely saturated with the fluid, care being taken that the relative position of the core sample with respect to the tube 90 is the same in both measurements.

Figure 6:
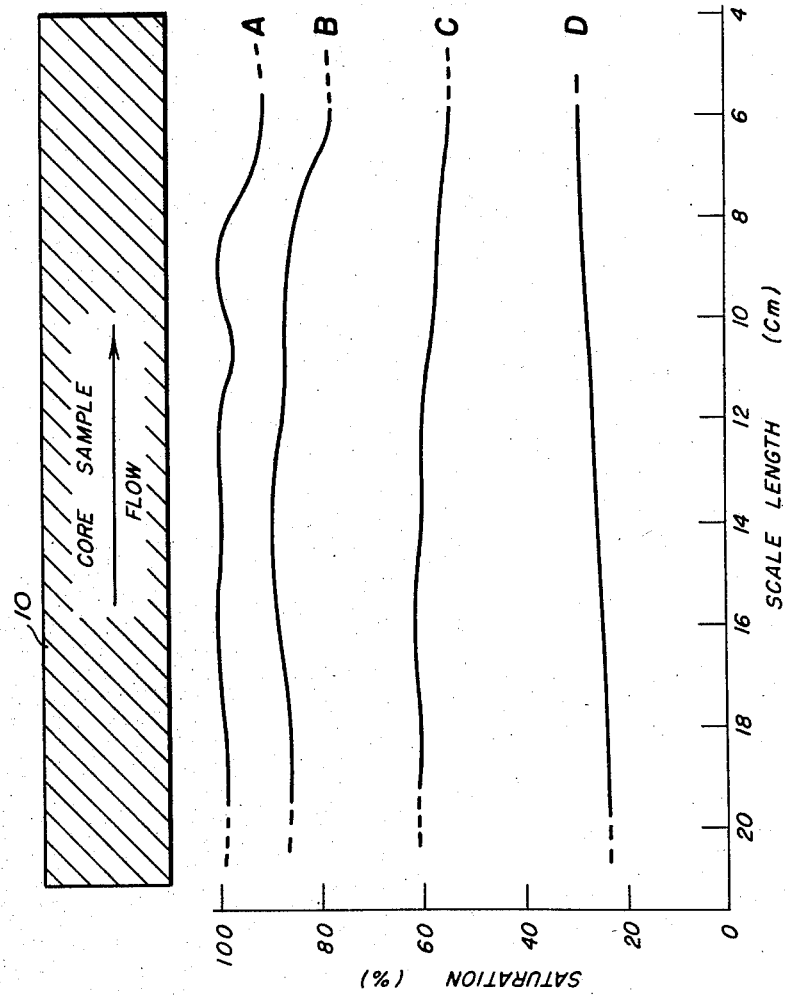
Figure 6 is a graph of fluid saturation versus length of a core sample.

Figure 6 illustrates the results obtained by measurement of fluid saturation of a core sample during measurement of fluid permeability. The core sample 10 as taken from the earth was thoroughly cleaned of all fluids and was saturated with kerosene. Air was to be employed as the non-wetting fluid and, accordingly, the intensity of the constant magnetic field and the frequency of the pulsating magnetic field were selected to obtain precession of hydrogen nuclei. These values were 1,460 gauss and 6.3 megacycles, respectively. The core sample tube was moved through the probe by manipulation of ring 61 so that the entire core sample passed through the coil 63 and the intensity of the induced current in the conductors 64 and 65 was measured as the core sample was passed through the coil 63. Air and kerosene were then passed through the core sample in the direction shown by the arrow at constant rates for a sufficient period of time for the establishment of equilibrium saturation conditions. The rate of kerosene flow was greater than the rate of air flow. After attainment of equilibrium saturation conditions, the core sample tube was moved again through the probe so that the entire core sample passed through the coil 63 and the intensity of the induced current in the conductors 64 and 65 was measured as before. The operation of passing kerosene and air through the core sample and, after the attainment of equilibrium conditions, moving the tube through the probe and measuring the intensity of the induced current in the conductors 64 and 65 as the sample passed through the coil 63 was repeated again. However, in this operation, the rate of kerosene flow was less than the rate of air flow. As a last operation, air alone was passed through the core sample and after attainment of equilibrium conditions, the sample tube was moved through the tube and the intensity of the induced current in the conductors 64 and 65 was again measured as the core sample passed through the coil 63. The intensity of the measured alternating current induced in the conductors 64 and 65 at complete saturation of the core sample is indicated by line A in Figure 6. In this figure, the abscissa is distance along the length of the core sample and the ordinate is the saturation, expressed in percent of complete saturation. The intensity relative to line A of the measured alternating current induced in the conductors 64 and 65 at the saturation condition attained at equilibrium with the rate of kerosene greater than the rate of water is indicated by line B. Lines C and D indicate the intensities relative to line A of the measured alternating currents induced in the conductors 64 and 65 under the saturation conditions attained at equilibrium with the rate of water greater than the rate of kerosene and with water only passed through the core sample, respectively. The relative values of the intensities of the measured alternating currents indicated on lines A, B, C, and D are thus the values of the percent saturation of the core sample to kerosene at equilibrium under the flow conditions employed.

It will thus be seen that, by the invention, fluid saturation of the porous material may be measured during measurement of permeability without interference with the latter measurement.

It has been found that the intensity of the magnetic field induced by precision of the atomic nuclei under many conditions is not linear with respect to the number of atomic nuclei within the common zones of influence of the constant and pulsating magnetic fields. A plot of the intensity of the induced magnetic field versus number of nuclei can be a curved line and the non-linearity is related to the surface properties and the pore size distribution within the porous material. Accordingly, in the measurement of physical conditions involving the number of atomic nuclei, the measurement of the intensity of induced current for both the unknown and known quantities of atomic nuclei should be made under equivalent conditions of intensity of constant magnetic field and frequency of pulsating magnetic field and with the same porous material. Also, the extent of non-linearity is a measure of physical conditions of surface properties and pore size distribution of the porous material and, by measurement of the non-linearity, information as to surface properties and pore size distribution of porous material is obtained.

While the intensity of the magnetic field induced by precession of the atomic nuclei of the fluid within the sample of porous material has been described as being measured in a direction perpendicular to both the constant and the pulsating magnetic fields, this measurement may be made in a direction parallel to the pulsating magnetic field. Where measurement is made in this manner by means of a separate coil, such as coil 63, having the same orientation as the coils 71 and 72, the coil will pick up the pulsating magnetic field induced by the coils 71 and 72. Thus, the current induced in the coil 63 by the precession of the atomic nuclei will have added thereto or subtracted therefrom the current induced by the pulsating magnetic field, depending upon whether the field induced by precession is in or out of phase with the induced pulsating field, respectively. Any change in the field induced in the coil 63 will be due to precession of nuclei and thus will be proportional to the number of the nuclei within the common zones of influence of the fields and the coil.

Measurement of the field induced by precession of the atomic nuclei need not be made with the assistance of a coil such as coil 63. For example, the field induced by precession of the nuclei may be detected with one or both of the coils, such as coils 71 and 72, employed for inducing the pulsating magnetic field. These and further modifications may be made by those skilled in the art.

Having thus described my invention, it will be understood that such description has been given by way of illustration and example and not by way of limitation, reference for the latter purpose being had to the appended claims.

I claim:
1. In a method for determining the permeability of a core sample taken from a subterranean oil reservoir to one of a plurality of fluid phases including at least a hydrocarbon phase and a water phase wherein said core sample is completely saturated with one of said fluid phases as a wetting phase and said other fluid phase is passed through said core sample with a measured rate of flow and with a measured pressure drop with the result that said core sample becomes less completely saturated with said wetting phase, and said other fluid phase is contained within said core sample, the steps for measuring the fluid saturation of said core sample to said wetting phase when less completely saturated with said wetting phase comprising completely saturating said core sample with, as a wetting phase, a first fluid phase selected from the class consisting of a hydrocarbon phase and a water phase, said water phase consisting of deuterium oxide, thereafter subjecting said core sample simultaneously to the action of a constant magnetic field and a pulsating magnetic field, the direction of each magnetic field being substantially normal to the other, and the pulsating magnetic field having a frequency given by the expression

$$f = \frac{\gamma H}{2\pi}$$

in which expression $f$ is the frequency in megacycles, $\gamma$ is the gyromagnetic ratio of the hydrogen atom contained in the molecules of the compound forming said wetting phase, and H is the intensity in gauss of the constant magnetic field, measuring the intensity of the magnetic field induced by precession of the nuclei of the hydrogen atoms in the molecules of the compound forming said wetting phase, passing through said core sample with a measured rate of flow and with a measured pressure drop a second fluid phase, other than said wetting phase, said second fluid phase being selected from the class consisting of a hydrocarbon phase and a water phase, said last named water phase consisting of deuterium oxide, thereafter subjecting said core sample again simultaneously to the action of said constant magnetic field and said pulsating magnetic field, and measuring the intensity of the magnetic field induced by precession of the nuclei of the hydrogen atoms in the molecules of the compound forming said wetting phase whereby the intensity of said induced magnetic field with said core sample less completely saturated with said wetting phase to the intensity of said induced magnetic field with said core sample completely saturated with said wetting phase bears the same relation as the extent of saturation of said core sample when less completely saturated as when completely saturated.

2. The method of claim 1 wherein said wetting phase is a liquid hydrocarbon.

3. The method of claim 1 wherein said wetting phase is liquid deuterium oxide.

References Cited in the file of this patent
UNITED STATES PATENTS

| 2,561,489 | Bloch et al. | July 24, 1951 |
| 2,613,250 | Bilhartz et al. | Oct. 7, 1952 |
| 2,799,823 | Shaw et al. | July 16, 1957 |

OTHER REFERENCES

Smaller: Physical Review, vol. 83, No. 4, Aug. 15, 1951, pp. 812–820. (In Div. 44.)

Jacobson et al.: Nature, vol. 173, No. 4408, Apr. 24, 1954, pp. 772–773.

UNITED STATES PATENT OFFICE

CERTIFICATE OF CORRECTION

Patent No. 2,913,658 November 17, 1959

Nathan Theodore Burdine

It is hereby certified that error appears in the printed specification of the above numbered patent requiring correction and that the said Letters Patent should read as corrected below.

Column 1, line 48, for "pase" read -- phase --; column 2, line 6, for "eleemnts" read -- elements --; line 13, for "Lamor" read -- Larmor --; column 7, lines 58 and 59, for "measused" read -- measured --; column 9, line 17, for "precision" read -- precession --.

Signed and sealed this 3rd day of May 1960.

(SEAL)
Attest:

KARL H. AXLINE
Attesting Officer

ROBERT C. WATSON
Commissioner of Patents